United States Patent [19]
Iida

[11] Patent Number: 5,255,197
[45] Date of Patent: Oct. 19, 1993

[54] LINE PRODUCTION MANAGEMENT SYSTEM

[75] Inventor: Kouji Iida, Suzuka, Japan

[73] Assignee: Honda Giken Kogyo Kabushiki Kaisha, Tokyo, Japan

[21] Appl. No.: 725,840

[22] Filed: Jul. 3, 1991

[30] Foreign Application Priority Data

| | | | |
|---|---|---|---|
| Jul. 6, 1990 | [JP] | Japan | 2-179041 |
| Jul. 11, 1990 | [JP] | Japan | 2-183338 |
| Jul. 16, 1990 | [JP] | Japan | 2-187711 |
| Jul. 18, 1990 | [JP] | Japan | 2-189654 |
| Jul. 18, 1990 | [JP] | Japan | 2-189655 |
| Aug. 3, 1990 | [JP] | Japan | 2-206122 |

[51] Int. Cl.$^5$ ............................................. G06F 15/46
[52] U.S. Cl. ............................................. 364/468; 364/132
[58] Field of Search ................ 364/468, 478, 131–134, 364/474.11, 401, 402, 403

[56] References Cited

U.S. PATENT DOCUMENTS

| | | | |
|---|---|---|---|
| 4,698,766 | 10/1987 | Entwistle et al. | 364/468 |
| 4,827,423 | 5/1989 | Beasley et al. | 364/131 |
| 4,958,292 | 9/1990 | Kaneko et al. | 364/478 X |
| 5,101,352 | 3/1992 | Rembert | 364/468 X |
| 5,166,874 | 11/1992 | Nomaru et al. | 364/468 X |

FOREIGN PATENT DOCUMENTS 0266784 5/1988 European Pat. Off. .
2239723 7/1991 United Kingdom .

Primary Examiner—Joseph Ruggiero
Attorney, Agent, or Firm—Dickstein, Shapiro & Morin

[57] ABSTRACT

A line production management system is provided. In the line production management system, a primary computer, a primary controller, a secondary controller, a tertiary controller and a number of processing machines are provided. The primary controller maintains work files containing work sequence data defining the classification, work priority and quantity of the work objects to be processed, and transmits the work file information through a communication network. The secondary controller generates and maintains correlation files to correlate each work sequence data included in the work files information with the codes which determine each processing to be applied to each work object in each work station, and transmits the correlation files through the communication network. The tertiary controller generates step files based on the work files and correlation files received through the communication network. The step files contain processing instruction data for each work station. In each work station, the processing machines are automatically controlled according to the processing instruction data received from the tertiary controller.

24 Claims, 18 Drawing Sheets

FIG.5

| LINE NAME | QUANTITY OF FLOWING OBJECTS |
|---|---|
| FR FLOOR | 14 |
| RR FLOOR FRAME | 15 |
| RR FLOOR PANEL | 16 |
| RR FLOOR COMP | 7 |
| L.H SIDE PANEL | 12 |
| R.H SIDE PANEL | 13 |
| L.H PILLER | 16 |
| R.H PILLER | 16 |
| L.H INNER | 21 |
| MAIN2 | 22 |

FIG.6

| LINE NAME | HEAD LOT No. | LAST LOT No. | RESIDUAL | LINE NAME | HEAD LOT No. | LAST LOT No. | RESIDUAL |
|---|---|---|---|---|---|---|---|
| FR FLOOR | 0601 | 0605 | 7 | FR COMP | 0601 | 0605 | 7 |
| RR FLOOR FRAME | 0606 | 0606 | 2 | FLOOR 3P | 0601 | 0605 | 18 |
| RR FLOOR PANEL | 0666 | 0609 | 26 | GW M/C | 0605 | 0605 | 20 |
| RR FLOOR COMP | 0601 | 0605 | 4 | SR-II | 0594 | 0605 | 28 |
| L.H SIDE PANEL | 0594 | 0605 | 3 | MR | 0594 | 0605 | 50 |
| R.H SIDE PANEL | 0594 | 0605 | 3 | MULTI | 0603 | 0605 | 56 |
| L.H PILLER | 0606 | 0609 | 29 | MAIN II | 0603 | 0603 | 58 |
| R.H PILLER | 0606 | 0609 | 29 | BONNET A/H | 0158 | 0159 | 55 |
| L.H INNER | 0606 | 0609 | 24 | TRUNK MSR | 0603 | 0605 | 48 |
| R.H INNER | 0606 | 0609 | 25 | HOOD MSR | 0594 | 0605 | 52 |
| ROOF | 0605 | 0605 | 9 | L.H FR DOOR | 0000 | 0000 | 18 |
| DA/BD UP | 0000 | 0000 | 0 | R.H FR DOOR | 0594 | 0605 | 2 |
| RR TRAY | 0583 | 0605 | 19 | L.H RR DOOR | 0606 | 0609 | 18 |
| FR W/H | 0603 | 0605 | 5 | R.H RR DOOR | 0606 | 0609 | 30 |

FIG.7

| TIME | PLAN | RESULT | DIFFE-RENCE | TIME | PLAN | RESULT | DIFFE-RENCE | TIME | PLAN | RESULT | DIFFE-RENCE |
|---|---|---|---|---|---|---|---|---|---|---|---|
| 7:00 | 0 | 0 | 0 | 7:10 | 4 | 0 | 0 | 7:20 | 9 | 5 | -4 |
| 7:30 | 13 | 13 | 0 | 7:40 | 18 | 14 | -4 | 7:50 | 22 | 14 | -8 |
| 8:00 | 27 | 14 | -13 | 8:10 | 31 | 14 | -17 | 8:20 | 36 | 14 | -22 |
| 8:30 | 40 | 14 | -26 | 8:40 | 45 | 14 | -31 | 8:50 | 49 | 14 | -35 |
| 9:00 | 54 | 0 | 0 | 9:10 | 58 | 0 | 0 | 9:20 | 63 | 0 | 0 |
| 9:30 | 63 | 0 | 0 | 9:40 | 67 | 0 | 0 | 9:50 | 72 | 0 | 0 |
| 10:00 | 76 | 0 | 0 | 10:10 | 81 | 0 | 0 | 10:20 | 85 | 0 | 0 |
| 10:30 | 90 | 0 | 0 | 10:40 | 94 | 0 | 0 | 10:50 | 99 | 0 | 0 |
| 11:00 | 103 | 0 | 0 | 11:10 | 108 | 0 | 0 | 11:20 | 112 | 0 | 0 |
| 11:30 | 117 | 0 | 0 | 11:40 | 117 | 0 | 0 | 11:50 | 117 | 0 | 0 |
| 12:00 | 117 | 0 | 0 | 12:10 | 117 | 0 | 0 | 12:20 | 120 | 0 | 0 |
| 12:30 | 124 | 0 | 0 | 12:40 | 129 | 0 | 0 | 12:50 | 133 | 0 | 0 |
| 13:00 | 138 | 0 | 0 | 13:10 | 142 | 0 | 0 | 13:20 | 147 | 0 | 0 |
| 13:30 | 151 | 0 | 0 | 13:40 | 156 | 0 | 0 | 13:50 | 160 | 0 | 0 |
| 14:00 | 161 | 0 | 0 | 14:10 | 164 | 0 | 0 | 14:20 | 170 | 0 | 0 |
| 14:30 | 174 | 0 | 0 | 14:40 | 179 | 0 | 0 | 14:50 | 183 | 0 | 0 |
| 15:00 | 188 | 0 | 0 | 15:10 | 192 | 0 | 0 | 15:20 | 197 | 0 | 0 |

1F LINE WORK STATIONS  [N=10]

| | | | | | | | | | | MEAN VALUE |
|---|---|---|---|---|---|---|---|---|---|---|
| FR W/H | 51.3 | 49.3 | 47.6 | 43.5 | 44.4 | 45.4 | 48.3 | 46.4 | 64.6 | 50.6 | 49.1 |
| FR COMP | 66.3 | 47.3 | 42.0 | 51.3 | 48.3 | 46.7 | 41.3 | 66.0 | 46.0 | 43.7 | 49.9 |
| FLOOR 3P | 44.0 | 43.8 | 43.9 | 44.4 | 49.6 | 49.8 | 67.2 | 43.8 | 43.7 | 108.3 | 53.9 |
| SR-II | 44.4 | 44.3 | 46.1 | 44.1 | 48.4 | 50.5 | 55.3 | 43.8 | 43.9 | 56.4 | 47.7 |
| MR | 48.9 | 52.2 | 51.8 | 43.2 | 47.6 | 48.4 | 49.1 | 71.1 | 50.6 | 152.6 | 61.1 |
| MULTI | 49.7 | 49.0 | 49.0 | 49.4 | 71.9 | 48.8 | 155.1 | 38.0 | 37.9 | 37.9 | 58.7 |
| MAIN II | 49.1 | 49.2 | 49.3 | 49.1 | 49.3 | 49.2 | 49.2 | 49.2 | 49.2 | 49.2 | 49.2 |
| BONNET MSR | 44.1 | 44.5 | 46.5 | 42.7 | 46.6 | 47.4 | 44.4 | 55.3 | 45.0 | 43.7 | 46.1 |
| TRUNK MSR | 43.2 | 50.3 | 44.2 | 45.3 | 42.4 | 48.5 | 44.8 | 42.8 | 62.2 | 37.8 | 46.2 |
| L. FR DOOR | 40.1 | 35.9 | 30.0 | 34.2 | 37.4 | 45.4 | 31.8 | 40.7 | 51.3 | 39.7 | 38.9 |
| R. FR DOOR | 37.4 | 53.3 | 45.1 | 30.4 | 45.3 | 34.8 | 39.9 | 34.1 | 58.2 | 40.3 | 38.4 |
| L. RR DOOR | 67.6 | 92.6 | 325.7 | 35.2 | 40.6 | 42.1 | 40.8 | 46.4 | 56.2 | 73.4 | 82.1 |
| R. RR DOOR | 37.1 | 42.6 | 35.6 | 79.2 | 34.6 | 78.0 | 32.9 | 79.8 | 33.8 | 74.2 | 52.8 |

DESTINATION: OFFICE 1S/2S LEADER, MAINTENANCE 1S/2S CHIEF, PLANNING STAFF

LINE SELECT  |  2F LINE

2F LINE WORK STATIONS [N=10]

| | | | | | | | | | | | MEAN VALUE |
|---|---|---|---|---|---|---|---|---|---|---|---|
| FR FLOOR | 43.6 | 41.7 | 46.5 | 59.9 | 42.9 | 57.4 | 122.0 | 45.3 | 43.1 | 48.8 | 54.7 |
| RR FLOOR FRAME | 62.4 | 37.6 | 59.1 | 43.2 | 44.5 | 41.4 | 41.2 | 69.4 | 44.3 | 43.7 | 48.7 |
| RR FLOOR PANEL | 49.0 | 48.7 | 41.0 | 59.1 | 43.3 | 44.4 | 41.7 | 41.1 | 69.3 | 50.7 | 48.8 |
| RR FLOOR COMP | 40.1 | 40.6 | 42.6 | 67.9 | 44.0 | 46.9 | 40.6 | 44.5 | 62.6 | 46.8 | 47.7 |
| L.H SIDE PANEL | 44.5 | 44.2 | 46.8 | 45.8 | 69.0 | 44.3 | 44.4 | 85.7 | 47.9 | 42.0 | 51.5 |
| L.H PILLER | 55.1 | 64.1 | 39.4 | 40.6 | 90.4 | 44.5 | 42.0 | 44.2 | 48.1 | 45.0 | 51.3 |
| L.H INNER | 120.9 | 555.5 | 30.6 | 33.5 | 34.7 | 47.4 | 66.3 | 64.0 | 125.1 | 64.1 | 114.2 |
| R.H SIDE PANEL | 53.6 | 55.0 | 45.9 | 42.5 | 54.1 | 53.8 | 42.5 | 83.7 | 48.3 | 47.8 | 52.7 |
| R.H PILLER | 51.4 | 53.4 | 55.2 | 56.2 | 64.8 | 49.2 | 45.7 | 34.8 | 61.3 | 33.5 | 50.6 |
| R.H INNER | 49.4 | 43.3 | 67.8 | 46.5 | 53.4 | 65.9 | 152.8 | 166.4 | 48.0 | 257.8 | 95.1 |
| ROOF | 42.3 | 115.6 | 51.4 | 42.3 | 42.3 | 42.2 | 42.3 | 42.3 | 43.3 | 50.6 |
| DA/BD UP | 49.3 | 0.0 | 0.0 | 0.0 | 0.0 | 0.0 | 0.0 | 0.0 | 0.0 | 0.0 | 49.3 |
| GW M/C | 44.9 | 44.2 | 44.0 | 48.1 | 45.2 | 49.6 | 67.7 | 44.1 | 43.5 | 91.5 | 52.3 |

DESTINATION: OFFICE 1S/2S LEADER, MAINTENANCE 1S/2S CHIEF, PLANNING STAFF

FIG. 10

SUMMARY OF PROCESSED WORK OBJECTS

| LINE NAME | QUANTITIES OF PROCESSED WORK OBJECTS | LINE NAME | QUANTITIES OF PROCESSED WORK OBJECTS |
|---|---|---|---|
| FR FLOOR | 19 | FR COMP | 393 |
| RR FLOOR FRAME | 26 | FLOOR 3P | 16 |
| RR FLOOR PANEL | 23 | GW M/C | 14 |
| RR FLOOR COMP | 19 | SR-II | 22 |
| L.H SIDE PANEL | 20 | MR | 17 |
| R.H SIDE PANEL | 21 | MULTI | 16 |
| L.H PILLER | 18 | MAIN II | 18 |
| R.H PILLER | 15 | BONNET A/H | 0 |
| L.H INNER | 23 | TRUNK MSR | 29 |
| R.H INNER | 18 | HOOD MSR | 38 |
| ROOF | 21 | L.H FR DOOR | 31 |
| DA/BD UP | 20 | R.H FR DOOR | 35 |
| RR TRAY | 15 | L.H RR DOOR | 41 |
| FR W/H | 27 | R.H RR DOOR | 17 |

FIG.11

FIRST WORK OBJECT  14th WORK OBJECT  
→ FIRST TIME AXIS  5th WORK OBJECT  UNIT: SECOND

| SECOND TIME AXIS ↓ | | | | | | | | | |
|---|---|---|---|---|---|---|---|---|---|
| (999.9) | 267.9 | 41.9 | 73.7 | (54.8) | 95.9 | 69.0 | 61.7 | 42.3 | 42.5 |
| 56.6 | 72.9 | 69.5 | (228.9) | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 |

FIG.12

| LINE NAME | HEAD LOT No. | LAST LOT No. | RESIDUAL | LINE NAME | HEAD LOT No. | LAST LOT No. | RESIDUAL |
|---|---|---|---|---|---|---|---|
| FR FLOOR | 0061 | 0060 | 59 | FR COMP | 0000 | 0000 | 0 |
| RR FLOOR FRAME | 0061 | 0061 | 53 | FLOOR 3P | 0000 | 0000 | 871 |
| RR FLOOR PANEL | 0060 | 0060 | -16 | GW M/C | 0059 | 0000 | -23 |
| RR FLOOR COMP | 0060 | 0060 | 46 | SR- II | 0000 | 0000 | -172 |
| L.H SIDE PANEL | 0061 | 0061 | 70 | MR | 0000 | 0000 | 0 |
| R.H SIDE PANEL | 0061 | 0061 | 65 | MULTI | 0014 | 0000 | 133 |
| L.H PILLER | 0061 | 0061 | 62 | MAIN II | 0000 | 0000 | -186 |
| R.H PILLER | 0061 | 0061 | 63 | BONNET A/H | 0000 | 0000 | 999 |
| L.H INNER | 0000 | 0000 | 46 | TRUNK MSR | 0000 | 0000 | 0 |
| R.H INNER | 0000 | 0000 | 51 | HOOD MSR | 0000 | 0000 | 0 |
| ROOF | 0061 | 0061 | 70 | L.H FR DOOR | 0000 | 0000 | 93 |
| DA/BD UP | 0000 | 0000 | 0 | R.H FR DOOR | 0000 | 0000 | 0 |
| RR TRAY | 0060 | 0060 | 13 | L.H RR DOOR | 0000 | 0000 | 0 |
| FR W/H | 0000 | 0061 | 63 | R.H RR DOOR | 0000 | 0000 | 0 |

| | INTRUPT | 0 6 | MODEL | AB7-X00- | RESIDUAL | 5 | PROSRAMED NUMBER |
|---|---|---|---|---|---|---|---|
| MACHINE | | | CODE No | | OP | | |
| CURRENT LOT | 0 8 | | AB1-X01 L | | 1 5 | 3 4 | HEAD LOT NUMBER 0665 |
| NEXT LOT | 0 8 L | | AB1-X02 | | | 4 | 0666 |
| RESERVE | 0 8 L | | AB2-X05 | | | 1 0 | 0667 |

STATUS OF NEXT WORK STATION    OOOOOOOOOO

| MAIN 2 | AUTO | MANUAL | CH |
|---|---|---|---|
| | | ■ | |

PROGRAMED QUANTITIES 9~14 FLOWING BETWEEN WORK STATIONS

QUANTITIES FLOWING BETWEEN WORK STATIONS**

TOTAL PROCESSED 193    INTERVAL OF TRIGERING 44.0 SEC    MEASUREMENT 52.5 SEC

| MODEL LIST | COMMAND SCREEN | SETTING SCREEN |
|---|---|---|

FIG.15

COMUNICATION CHECK
by 30" INTERVAL

Ye-NET ERROR COUNTER

SET 1 IN
ERROR     RESET
COUNTER      0

ABNORMAL STATUS 1

| # | Name | Counter |
|---|------|---------|
| 1 | FR FLOOR | 0000 |
| 2 | RR FLOOR FRAME | 0000 |
| 3 | RR FLOOR PANEL | 0000 |
| 4 | RR FLOOR COMP | 0000 |
| 5 | L.H SIDE PANEL | 0000 |
| 6 | R.H SIDE PANEL | 0000 |
| 7 | L.H PILLER | 0000 |
| 8 | R.H PILLER | 0000 |
| 9 | L.H INNER | 0000 |
| 10 | R.H INNER | 0000 |
| 11 | ROOF | 0000 |
| 12 | DA/BD UP | 0000 |
| 13 | RR TRAY | 0000 |
| 14 | FR W/H | 0000 |
| 15 | FR COMP | 0000 |
| 16 | FLOOR 3P | 0000 |
| 17 | GW M/C | 0000 |
| 18 | SR-II | 0000 |
| 19 | MR | 0000 |
| 20 | MULTI | 0000 |
| 21 | MAIN II | 0000 |
| 22 | BONNET A/H | 0000 |
| 23 | TRUNK MSR | 0000 |
| 24 | HOOD MSR | 0000 |
| 25 | L.H FR DOOR | 0000 |
| 26 | R.H FR DOOR | 0000 |
| 27 | L.H RR DOOR | 0000 |
| 28 | R.H RR DOOR | 0000 |

MENU

LINE PRODUCTION MANAGEMENT SYSTEM

BACKGROUND OF THE INVENTION

1. Field of the Invention

The present invention relates to a system of management of assembly line production, for example automobiles assembly line production, in which different models of work objects are sequentially being processed and assembled.

2. Prior Art

In a typical line production, various work stations are disposed along a production line, and the work objects are moved along the line from work station to station. In the respective work station, the various mechanical operations are applied to the work objects which come thereto. In the case of producing automobiles (referred to as cars hereinafter) and the like, a number of different models of cars is processed and assembled through the same production line. For that reason, the operations of respective work stations must be properly controlled so that the appropriate mechanical operations for the models and classes of the work objects are performed by respective work stations.

Conventionally, in order to achieve the production of different models, a series of data conversion processes are performed by operators. Hereinafter, the description will be given with respect to such data conversion processes with reference to FIG. 16.

Work commands are given and stacked on demand in the line production, and work sequence data, in which the respective work commands are organized in the order of work priority sequence, are updated. Each work command includes such information as model types (model year, manufacturing plant, 2- or 4-door) to be produced, family groups (domestic or foreign) and options (sunroof and others), lot number (given to each lot of a group of same type of cars), lot size (the quantity of cars to be produced). Basically, the processing to be applied to the work objects depend on the type of cars such as the models and classes of that. In the first conversion shown in FIG. 16, the work sequence data are rearranged for respective work stations in the line production, whereby step sequence data which define the sequence of processing steps for respective models and classes of cars are obtained and supplied to respective work stations. Next, in the second step, in each work station, an operator sequentially picks up work commands from the step sequence data, and converts the picked up work command into the processing pattern data containing a series of commands to be given to processing machines in that station (the second conversion), after which the operator enters the commands to a controller according to the processing pattern data. In this manner, the work sequence data needed to be correlated twice, manually. In each processing machine, the command manually entered by the operator is converted to the job code which designates the operation to be performed by that processing machine based on a correlation table which is stored in internal memory and contains a set of job codes corresponding to respective commands (the third conversion). The job code contains information on the processing tool bit numbers, fabrication patterns, job numbers for the automated processing machine (for example, action patterns, numbers to represent welding conditions). In this manner, processing pattern data are manually generated and sequentially entered to controller, whereby the work objects are sequentially supplied to the respective processing machine in order of their work priorities and the appropriate operations according to that processing pattern data are applied to the work objects.

For example, in the operation to weld side panels to floor panels, work sequence data are converted into step sequence data which are converted into machine patterns recognizable by the machine, and are entered into the welding controller. The welding machine then takes out appropriate side and floor panels, according to the model and class information specified in the work and step sequence data, and sets the panels into proper jigs and prepares machine codes and welds the two panels according to machine patterns appropriate for the model and class, and thereby accomplishes an assembling operation of side panels to floor panels.

As described above, the conventional procedure of operating the assembly line was labor-intensive since each work station required manual inputting of processing data into each automated processing machine. Accordingly, management of such a system was inefficient, and in spite of line automation, the production efficiency was also low because of the extra work load such a system created. In addition, when there is a change in the production schedule, such as production of another model, the content of the work sequence must be changed correspondingly. Thus, processing data, such as the processing pattern data, need to be changed correspondingly, and for every change, the work station operator needs to be instructed on the change protocol. The same problem arises when there are changes due to customer order or rework, requiring loading of different processing data. Further, processing instruction data contain a large number of identification codes according to their model, work sequence, machine job patterns and many other information codes to correlate various car bodies with their processing requirements. When a change is to be made to such masses of data, the operator was confronted with a difficult manual task of analyzing the data and identifying the necessary corrective actions to be made throughout his own line. Furthermore, such an action in one line would inevitably affect the productivity of not only his own line but other processes and lines as well, resulting in a serious loss of overall productivity of a plant.

SUMMARY OF THE INVENTION

In order to overcome the above-described problems, it is an object of the present invention to provide a line production management system which permits a reduction in the work load of manual steps required for data handling and, in particular, provides for efficient procedure for data alteration in order to achieve automated assembly line operations of improved productivity.

In an aspect of the present invention, there is provided a line production system, wherein an assigned quantity of work objects flow from upstream work stations to downstream work stations according to an assigned work sequence in an automated production line, said line production management system comprising:

a primary controller to maintain work files containing work sequence data defining the classification, work priority and quantity of the work objects to be processed, and transmit said work file information through a communication network;

a secondary controller to generate and maintain correlation files to correlate each work sequence data included in said work files information with the codes which determine each processing to be applied to each work object in each work station, and transmit said correlation files through said communication network;

a tertiary controller to generate step files based on said work files and correlation files received through said communication network, said step files containing processing instruction data for each work station, and processing means to process said work objects according to the processing instruction data received from said tertiary controller.

The other objects and features of this invention will be understood from the following description with reference to the accompanying drawings.

BRIEF DESCRIPTION OF THE DRAWINGS

FIG. 5 illustrates an actual example of information on the quantity of flowing objects between the lines;

FIGS. 6, 10 and 12 show the overall summary screen showing the quantity of current residual car bodies;

FIG. 7 shows an example of detailed current status of the quantity of car bodies produced;

FIG. 11 shows an example of cycle data for different process machines;

FIGS. 13 and 14 show example of processing instructional display;

FIG. 15 shows an example of communication problems;

DETAIL DESCRIPTION OF THE PREFERRED EMBODIMENTS

A preferred embodiment of the present invention is explained in the following in reference to drawings.

Figure 1A:
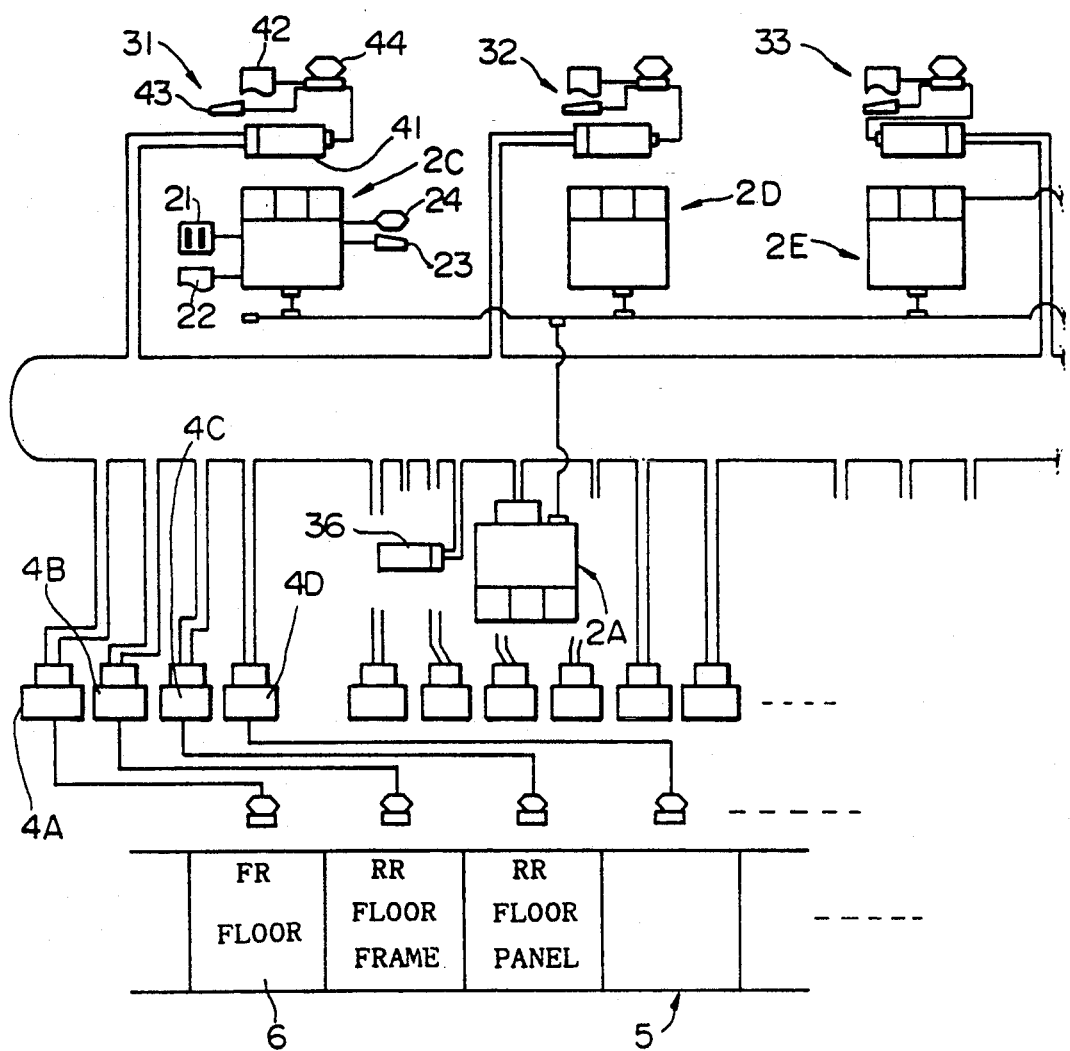
FIGS. 1A and 1B are schematics of the communication network of the welding operation provided with a line production management system of a preferred embodiment of the present invention.
Figure 1B:
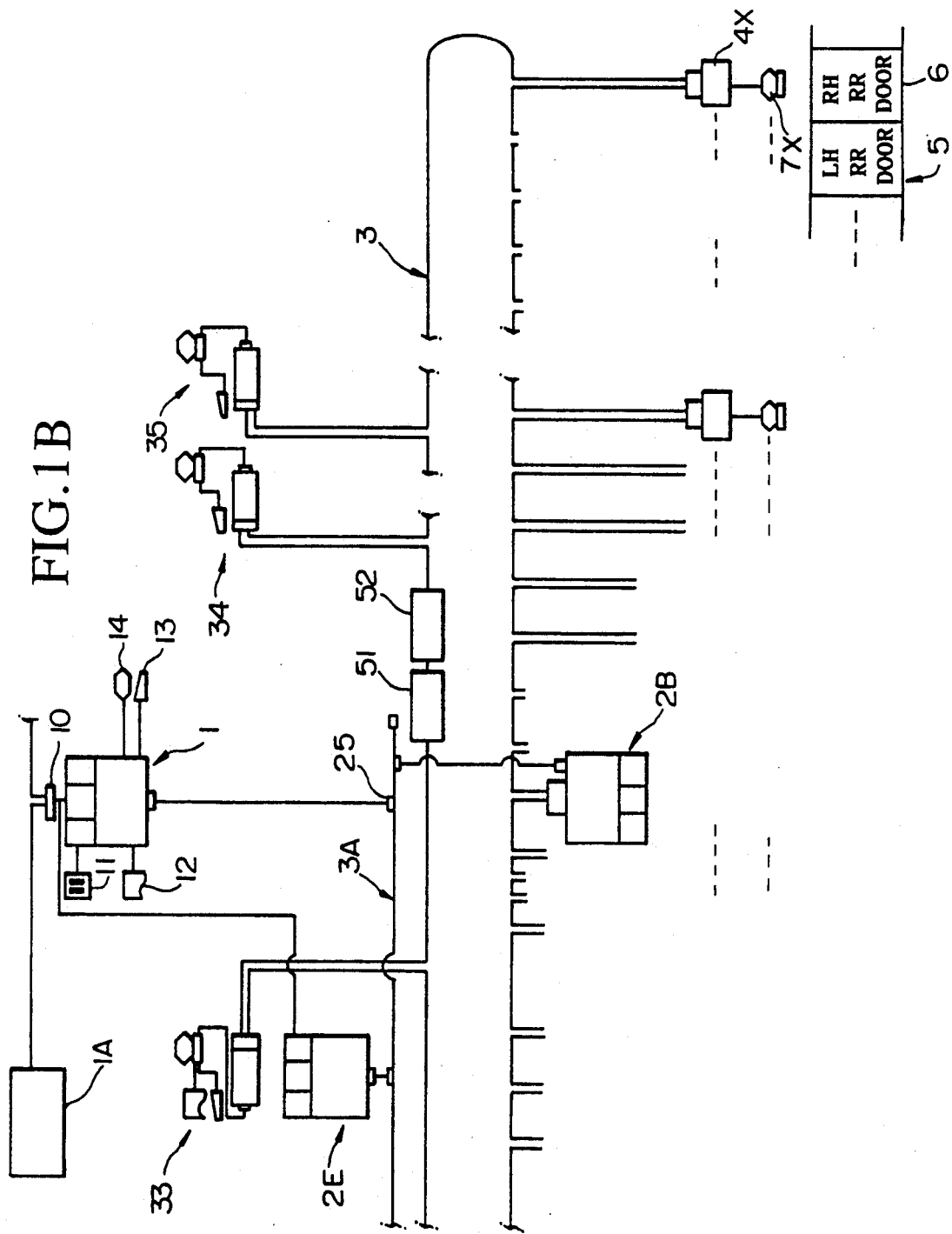

The overall system construction is explained first. FIGS. 1A and 1B are schematic drawings showing the communication network of a welding work station in automobiles assembly line production. In these drawings, numeral 1 designates a host computer 1 (primary controller) containing work files; 2C, 2D and 2E designate model-group computers (secondary controllers) which maintain model-based information; and 2A and 2B designate work station computers (tertiary controllers). The host computer 1 includes peripheral components such as disk drive facility 11, printer 12, keyboard 13 and CRT display 14. Similarly, the model-group computer 2c includes peripheral components such as disk drive facility 21, printer 22, keyboard 23 and CRT display 24. The same arrangement of peripheral facilities are available also for the other maintenance computers 2D and 2E, and the work station computers 2A and 2B (the schematics are omitted). The numerals 3, 3A refer to a communication network which includes six peripheral PCs (personal computer) in network 3A and forty four nodes in network 3. 4A through 4X designate weld sequences (processing means) which comprise welding robots which perform welding tasks. Numeral 5 refers to the assembly line (hereinafter referred to as the line 5), on which work objects, car bodies 6 in this embodiment, move from upstream to downstream work stations. The car bodies 6 are piled on a cart (not shown) in a given quantity and work sequence. On the line 5 are provided a large number of work flow lines 203 through 212 for each stage of the welding process. In each work flow line, processing information for each stage is collected and supplied on the network 3. Numeral 25 refers to a transceiver for the communication network 3A. Other transceivers are not shown to avoid unnecessary crowding of the schematic drawing.

The role of the host computer 1 is to receive weekly work sequence information, for example, supplied from an external computer 1A, and to check for the continuity of work sequence data and store as work file.

The work file contains work sequence data concerning the work content (particularly the work sequences) for the various types of car bodies 6 arranged on the line 5 waiting to be processed; each data is defined for each lot constituted of required quantity of car bodies 6 which have the same classification (i.e., model, class and the like).

The work sequence data contains such information on the car bodies 6 as the model information (models and class, 2- or 4-door) and destinations information (domestic or foreign; cold climate) and option data (sunroof for example). These data must correspond with the model-, destination-based codes and option codes stored in the various work stations. The work file information is transmitted to the work station computers 2A, 2B and to model-group computers 2C, 2D and 2E via the communication network 3A.

In this manner, the host computer 1 performs the duties of: setting and maintaining the work sequence for the required quantity of car bodies 6 on the line 5 of various models and destinations; and transmitting the work file information through the communication network 3A to PCs.

Further, the embodiment includes in its communication network 3 such extra facilities as the process and emergency monitoring systems (to be described later in more detail) which not only monitor the job progress on the car bodies 6 but also monitor the presence of abnormalities in the various work stations. This monitoring is performed either by a remote centralized observation facility or by a local operator facility provided on the line 5. The communication network also performs more than one processing-related duties such as forwarding of report on processing status in the next processing step, the quantities of flowing work objects, the quantity of work objects processed through fabrication processes and their cycle times.

The host computer 1 monitors the status of work stations through the above-described monitoring means, and collects the following information.

1. dynamic quantities of production of work objects flowing between own work station and the next work station which are calculated based on the monitored quantity of work objects which have been processed in one work station and the monitored quantity of work objects which have been processed in the next work station 2. operational mode of processing machines in work stations 3. number of work objects which are processed during a constant interval in each processing machine The host computer 1 properly controls the other devices in the system based on the above-described information, and transmit the above-described information through the network 3.

Furthermore, the host computer 1 has a capability to be intervened by external interrupt signal means independent of the management system.

Additionally, in the preferred embodiment, work sequence data in work file are rearranged in order to reduce the work load of the work station computers. Each rearranged data includes: model-based destination codes for each work station; option codes for the same; machine job pattern codes for the same; work material codes for the same; and setting of the representation numbers for the various collective codes. The model-based destination codes represent such information as different model of cars, 2- or 4-door cars, domestic or foreign destinations, and require multi-digit codes.

Basically, the processing to be applied to the work objects depends on the classification of cars such as the models and classes. Thus, it may be possible to use a method in which unique code numbers are assigned to respective classification of cars, and the operations to be applied to the work are determined based on the code of the processing work. However, there is an extremely large number of classification of cars so that the method mentioned above cannot be used. Meanwhile, there are cases in which the same processing can be applied to a plurality of different models and classes of cars in some work stations in the line production. Thus, using an improved encoding method, in which a code is defined for each common processing, the same code can be assigned to models and classes of cars which require the same processing in that work station. Thus, by using the improved encoding method, the model-based destination code and the other codes described above can be simplified to the minimum practical level of effectiveness on the line. The rearranging function is achieved as follows.

The work file information in the host computer 1 is forwarded, through the regular PC communication network 3A, to the model-group computer 2C, 2D and 2E to serve as backup data. The model-group computers 2C, 2D and 2E create and maintain correlation files, which contain model-based destination codes for processing instruction for each of the work stations in the line 5. The created correlation files are then transmitted to the host computer 1.

Another function of the model-group computers 2C, 2D and 2E is to provide file backup functions or redundant functions to the host computer 1 or to the work station computers 2A, 2B.

The correlation files from the model-group computers 2C, 2D and 2E are stored first in the host computer 1, and are then entered into work station computers 2A and 2B through the communication network 3A. Based on the work sequence files and the correlation files, the work station computers 2A and 2B generate process-based data for different car bodies 6 according to their proper models and classes, and issue processing instructions to processing means or various sequencers 4A through 4X.

The welding sequencers 4A through 4X are distributed through the work stations in the line 5, and perform welding jobs, following the processing instructions provided by the work station computers 2A and 2B, for car bodies 6 in their predetermined order of arrangement, and following the assigned procedure for the various models.

Figure 2:
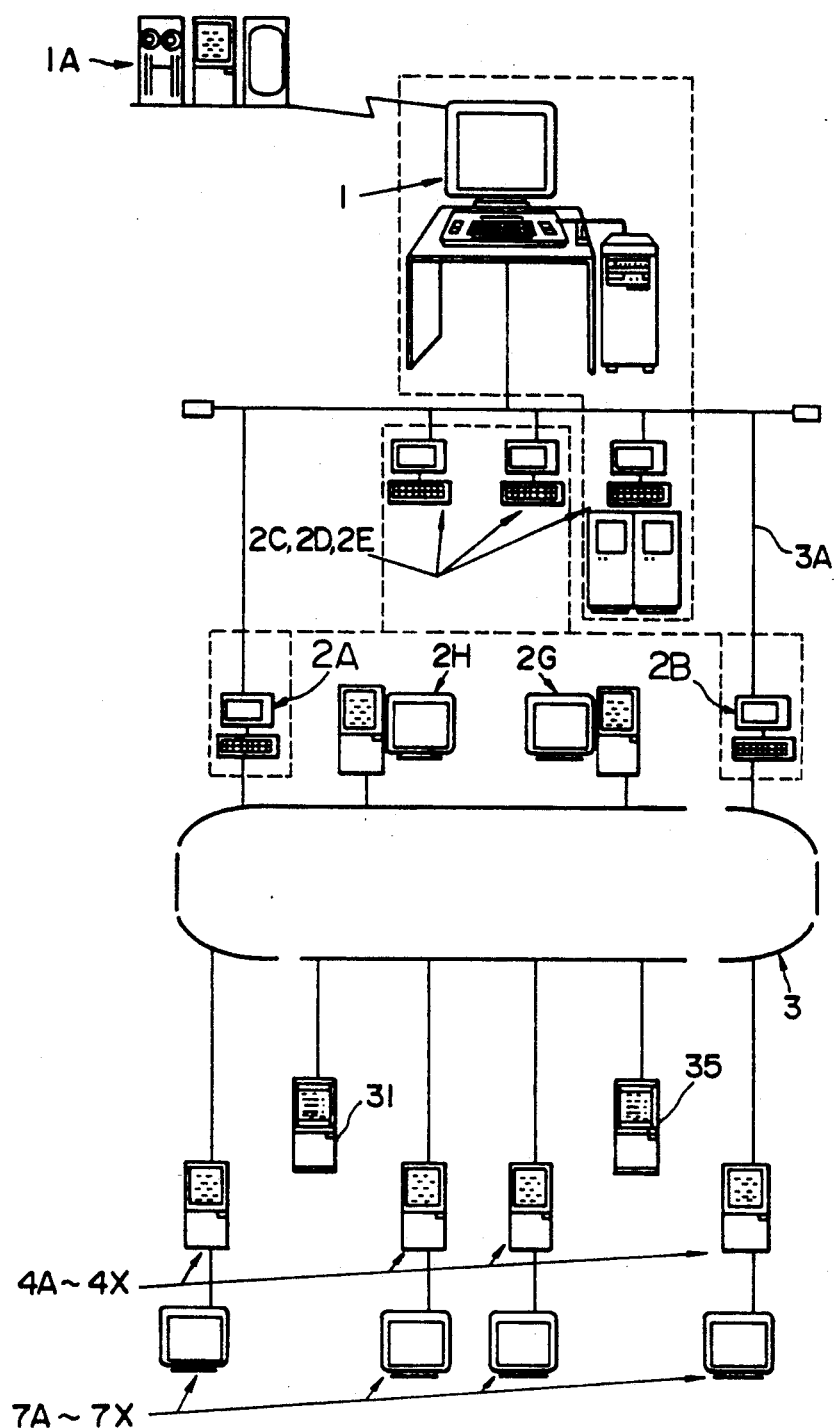
FIG. 2 is a schematic for the process instruction computer network provided in the network shown in FIGS. 1A and 1B.

FIG. 2 is an illustration to provide easy understanding of the network system for communicating the processing instructions. In the drawing, 2G designates a net production monitor; 2H designates a net data collecting controller; 4A through 4X designate sequencers described above, and 400A through 400X designate CRT display means connected to the sequencers; 7A through 7X designate CRT-equipped operator panels having the capabilities of serving as monitors for processing data and as emergency monitors.

The information on the current status of the various sections of the management system is provided by current status monitoring computers (hereinafter referred to as current status computers) 31 through 35, shown in FIG. 2. These computers are located in general offices, maintenance, planning, and shipping departments, and display real-time operating status of the management system. The current status computers 31 comprise a main computing body 41, printer 42, keyboard 43 and CRT display 44. Similar provisions exist for other current status computers, but their numerical designations are omitted. 51 designates a line server within the network 3, and 52 designates a power generator.

The type of information processed within the network 3 is shown below:

1. processing instructions,
2. current quantity of processed objects,
3. cumulative line stoppage time,
4. line productivity, or processing rate per unit time,
5. between lines flow rate: relationship between the cumulative quantity of objects in the current process stage vs. the cumulative quantity of objects in the next process stage,
6. line control signals; channels, manual, abnormal, etc.,
7. maintenance alert signal,
8. work instructions signal, and
9. line status signal.

The following is a description of the workings of the system based on the preferred embodiment.

In welding fabrication process, for example, work file containing, mostly work sequence data, for one-week production of car bodies 6 is forwarded from the external computer 1A to the host computer 1. This file generates and maintains information on work content (particularly work sequence) for the various types of car bodies on the line 5, which are arranged in groups according to the required quantity of cars, models and other relevant factors. The work file contains such information on the car bodies 6 as the model information (models and classes, 2- or 4-doors) and destination information (domestic or foreign) and other data pertinent to the identification of car bodies.

The model-group computers 2C, 2D and 2E create the correlation file containing data for the various processing stations in terms of their models and destination, and the data are transmitted back to the host computer 1 to be saved.

Next, the processing instructions are generated by the work station computers 2A, 2B, in accordance with the input work sequence data from the host computer 1 and the correlation file from the model-group computers 2C, 2D and 2G. The generated processing instructions are grouped into proper groups in terms of the model-groups and other pertinent data, after which the grouped instructions are properly transmitted to sequencers 4A through 4X. Meanwhile, moving from upstream to downstream on the line 5 are car bodies 6 on carts in a required quantity and work sequence. Welding operations are performed successively on these car bodies 6 by the sequencers 4A through 4X located in various assembly lines, in accordance with the required quantity and work sequence.

During the processing period, not only the progress of the processing stages but also the presence of any abnormalities are monitored. When abnormalities are detected, they are promptly displayed on the highest priority monitor through a routine procedure.

The following are some examples of abnormalities which can occur in the processing information data and in the production management system.

1. Display of abnormality in the processing machines or in the communication routes. The operator is alerted to the displayed. Display of abnormalities is made for processing controller malfunctioning (e.g. sequencers 4A through 4X) as well as for communication problems.
2. Detection and display of abnormalities. Display is made only in the common space between the processing motion and work sequence. The method of display is both by visual CRT screen and by voice alert. When there is mismatching in the processing patterns in the processing job and the (robot) movement patterns in the work sequence, the operator can stop the operation of the processing machine.
3. Data monitoring is carried out by the assembly line attendant from a remote, centralized monitoring station. The quantity of car bodies processed is monitored in the end data saved in the current status computer or in the current status collecting computer. The attendant is able to access any work station data and have them displayed on the attendant's CRT. The planned time-based production quantity is compared against the current state, and the computed difference can be displayed either numerically or graphically. The quantity of car bodies flowing between the lines can also be monitored, and can be displayed graphically as in the case of the quantity of processed car bodies. It is also possible to display this information for different lines numerically or by a color-separated display on a line layout plan. Further, the content of the current status monitoring computer includes: line-by-line summary of the processing information, the status of next processing stage and the quantity of flowing car bodies within the communication network 3, the data on the quantity processed and cycle times in the processing machines.

In addition, the processing status is displayed on CRT display 400A through 400X, as necessary. The contents of display data, transmitted through the communication network 3, are for example, summary of processing status of various lines, status of the next processing stage and the quantities flowing between the lines, the quantities of processed objects on processing machines and cycle times. Also shown is information concerning model-based processing data grouped according to destinations, and the quantities remaining in the current lot, next lot and reserved lot for each of the car bodies 6 on the line 5.

In addition, the host computer 1 is programmed to accept interruption at any time. The instances which allow interruption are as follows.

1. The work content for the car body 6 needs to be altered.
2. The operator needs to manually enter N/C processing patterns and the quantity of work objects to be processed. This operation is performed through the CRT displays 400A through 400X which are connected to the sequencers 4A through 4X by switching the display screen to parameter-setting display mode, and setting the required number or the patterns by moving the cursor to appropriate selections. The changes in work content can similarly be specified through the CRT terminal.
3. To automatically display model types, destinations and options data. This operation is performed by specifying the processing pattern symbol which represents a group of cars having the identical model, destination and options. The pattern symbols are transmitted from the host computer 1 through the work station computers 2A, 2B and are stored in the processing controllers (sequencers 4A through 4X).

Figure 3A:
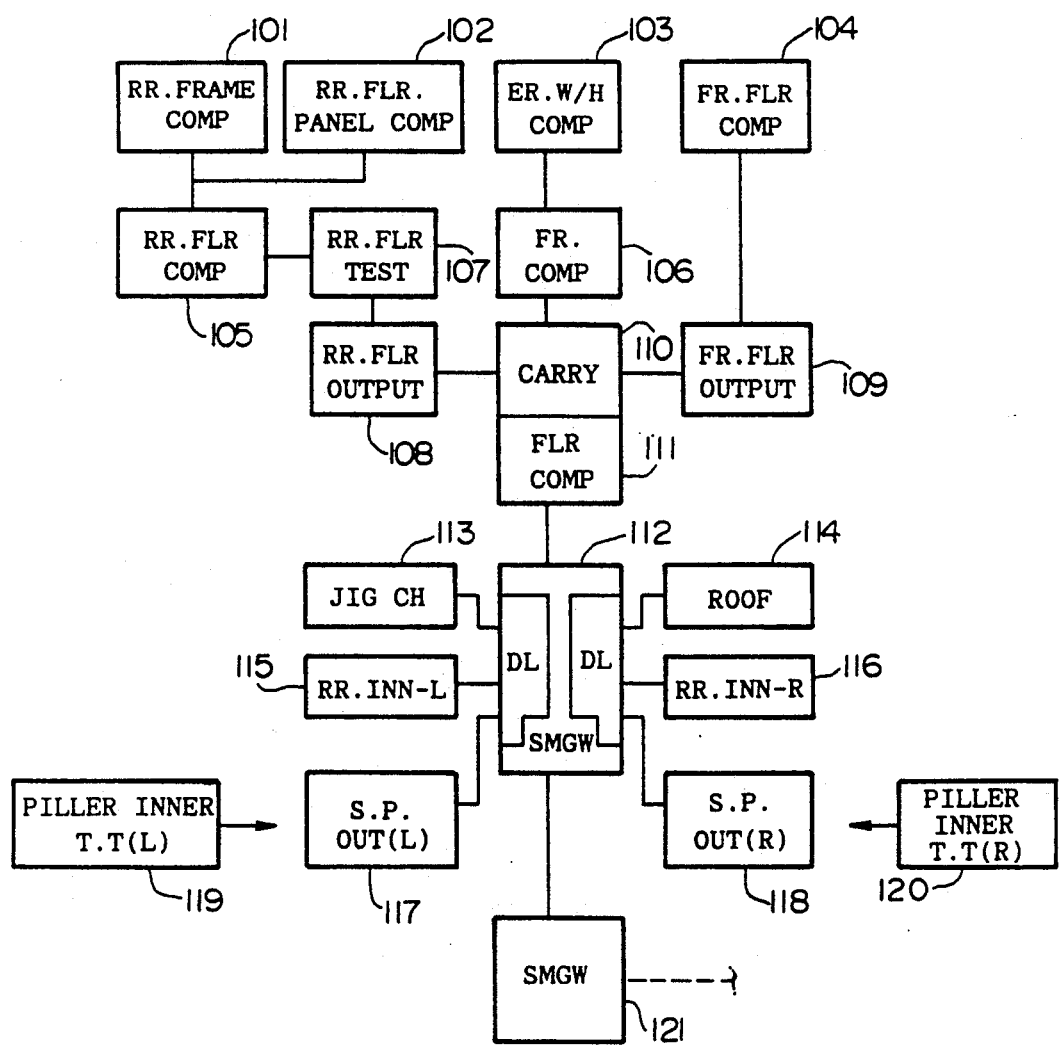
FIGS. 3A and 3B are flow charts to show the actual welding steps.
Figure 3B:
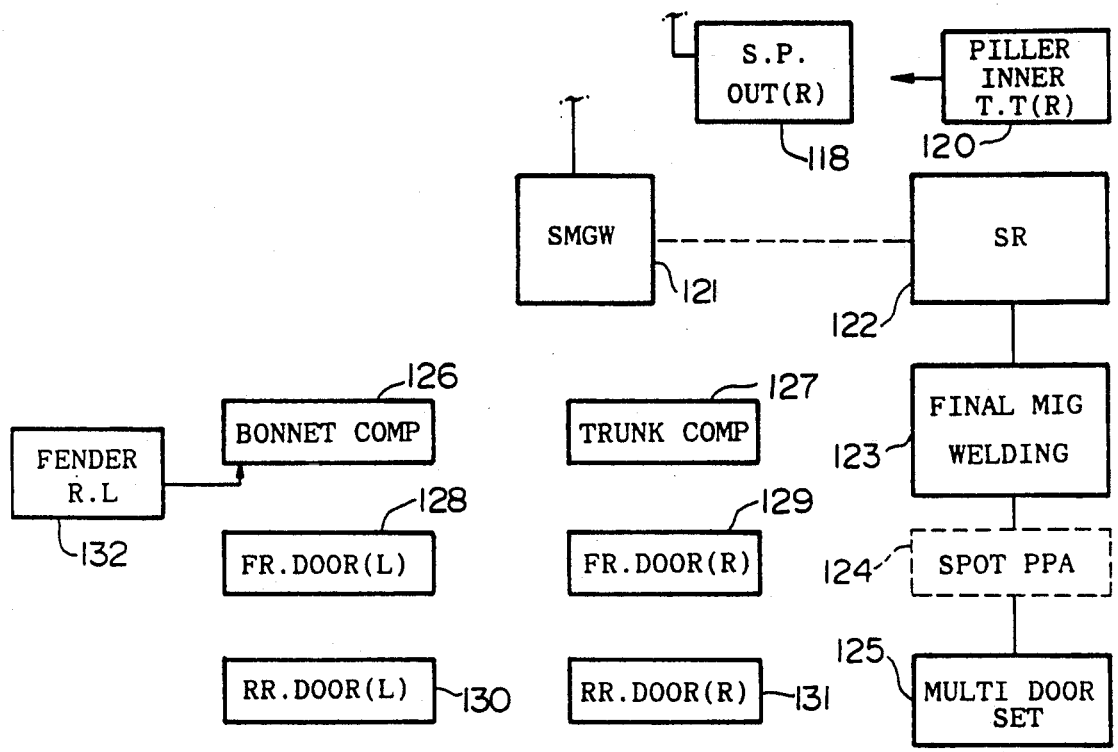

FIGS. 3A and 3B show an actual welding process flow chart. The processing steps 101 to 106 consist of activities related to assembling of; rear frames, rear floor panels, front wheel housing, front floors and rear floors, (indicated by COMP); step 107 is inspection of the rear floor; and in steps 108 and 109, the rear and front floors are transferred out to the next processing stage. Step 110 is the delivery step of all the fabricated components and in step 111, they are assembled into a floor. Step 112 is submerged-arc welding (SMGW), but preceding this step, down loading of some components from the second floor to the first floor of the factory is carried out in steps 113 to 118. That is, in step 113, jigs are exchanged and in step 114, the roof components are lowered from the second to the first floor, and in steps 115 and 116, the left and the right rear inner panels are lowered. Likewise, in steps 117 and 118, the left and right components of the side panels are lowered; and in steps 119 and 120, the left and right components of the inner pillar are lowered. In step 121, reinforcing welds are placed on top of the SMGW region, and likewise in step 122, spot welding (SR) are made for reinforcements. Final MIG welding is performed in step 123. When necessary, manual welding step 124 is performed in cases of problems with the spot welder. Step 125 is attachment of the door sets. The steps 126 through 132 involve assembly operations such as bonnet, trunk, right and left front door assemblies, and are carried out, at suitable stages, in parallel with the foregoing steps.

Figure 4:
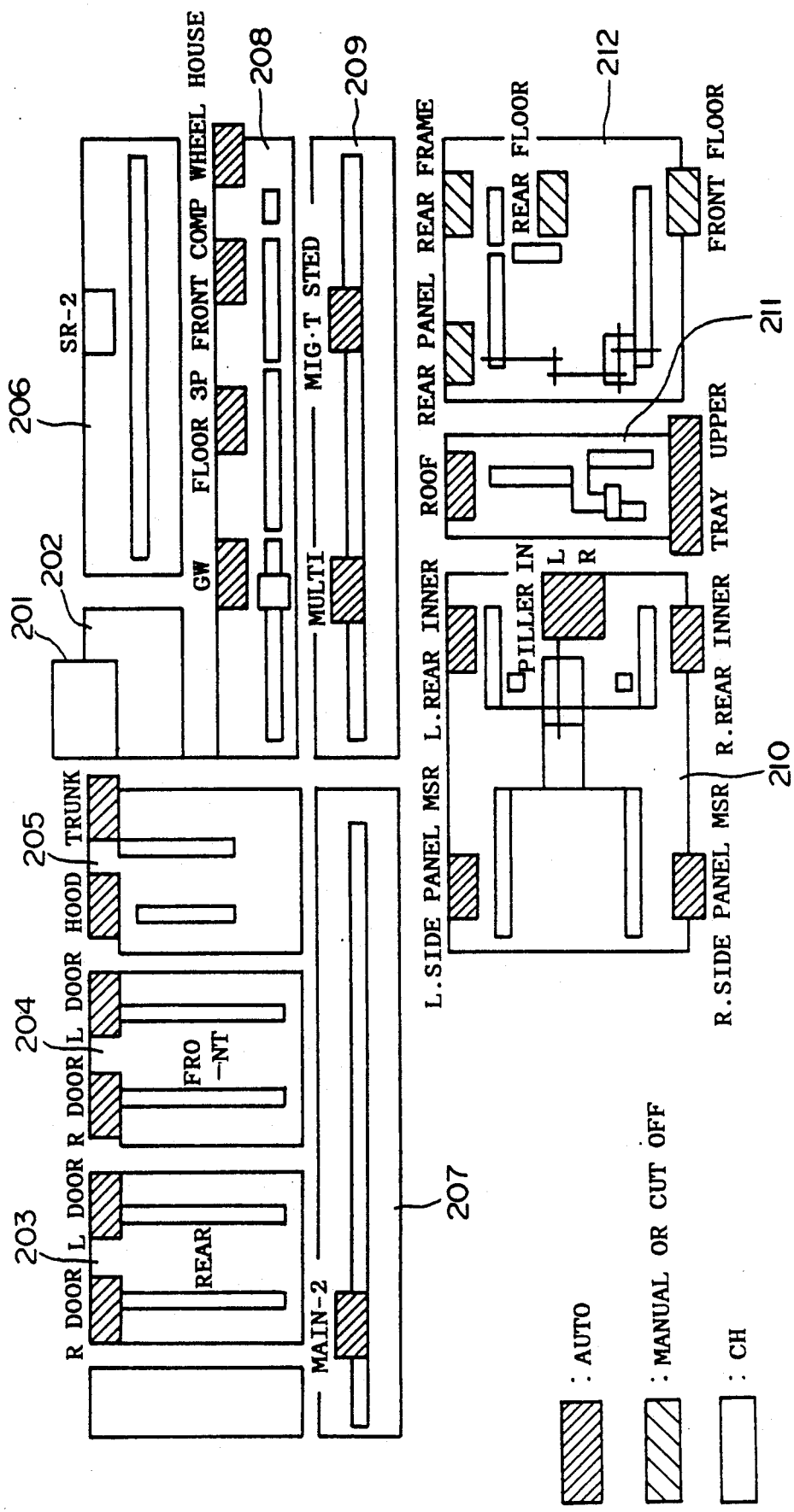
FIG. 4 is a schematic diagram to show the arrangement of the various production lines.

FIG. 4 shows an example of the operating status of various assembly lines. The assembly lines 203 through 212 surrounding the office 201 and maintenance department 202 are arranged according to various welding steps. That is, in FIG. 4, the solid black regions indicate automatic welding process lines, and the hatched regions indicate manual welding lines or cutting work. The white regions indicate tool changing operations (CH).

The communication network provides information exchange functions, such as receiving and transmitting of the information related to the status of next processing stage, the quantity of flowing objects, setting of the name and the node numbers for the next processing stage. FIG. 6 illustrates an actual example of information on the quantity of flowing objects between the lines. Further, regarding the processing machines information, the results oriented information such as the quantity of welded panels and the cycle times (which is equivalent to productivity per unit time), the communication network provides the function of setting the quantity of car bodies to be welded, maintenance of information on the cycle times; it also handles objectives setting type of data such as setting of the production quantity of car bodies and processing machine operating modes (manual or automatic), selection of one processing cycle timing, and setting of cycles with or without the work objects in the machine. The cycle time is essentially the productivity count, and the data are maintained in read/write files, and are entered into, for example, register circuits in the communication network 3. The computation of production counts is performed by taking a completed car body assembly as work sequence data, which accumulate in a day to constitute a day's production data. The previous day's accumulated production data are cancelled automatically at the beginning of a new day.

Monitoring of the progress of processing is illustrated in FIG. 6 for residual quantity of car bodies from a lot and in FIG. 7 for actual quantity of car bodies welded. The method of displaying the information is, as shown in FIG. 6, the overall summary screen first, and if a detail of "roof" is required, hour-by-hour details of the roof production status can be displayed as shown in FIG. 7.

Figure 8:
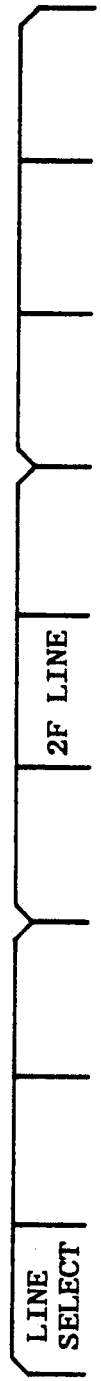
FIGS. 8 and 9 show the cycle time data of the first and second floors production.
Figure 9:

The cycle time data consist of two displays, which are shown in FIGS. 8 and 9, corresponding to the data from the first floor and those from the second floor, respectively. The reversible black and white display spaces always display the newest data, and every time the display reverses, the averaging process is updated and the results are displayed.

FIG. 10 shows a summary table showing the accumulated quantity of processed car bodies from various lines, and FIG. 11 is an example showing cycle data for different process machines. The columns in FIG. 11 are arranged according to first time record and the rows refer to second time record. In this example, the actual processing times for the first, fifth and the fourteenth car assemblies are shown.

Regarding the lot data on the processed car bodies (which corresponds to a specific grouping of car bodies according to model, destination etc.), display panels 400A through 400X show destination-based data groups and the residual quantity of car bodies grouped into three groups of current lot, next lot and reserved lot.

An example is given in FIG. 12 which shows the quantity of residual car bodies for the various lines.

An actual example of a processing instruction display is shown in FIG. 13, and such displays have the following features:
- the current lot only is shown in color coded display;
- the current data are cancelled when the quantity of residual car bodies become less than zero;
- the data can be cancelled manually or automatically;
- the next lot is displayed as the current lot after the current lot has been cancelled, likewise, the reserved lot is displayed as the next lot after the next lot has been cancelled;
- the pieces of information at the end of reserved lot are progressively shown, when the reserved lot data become empty, the line area computer is contacted for more data;
- the end data which do not appear in the reserved lot display are indicated only in terms of presence or absence of data (maximum capacity is ten lines);
- end data including current lot data are saved in the processing controller;
- only the quantity of residual car bodies in the current lot can be adjusted manually.

Figure 14:
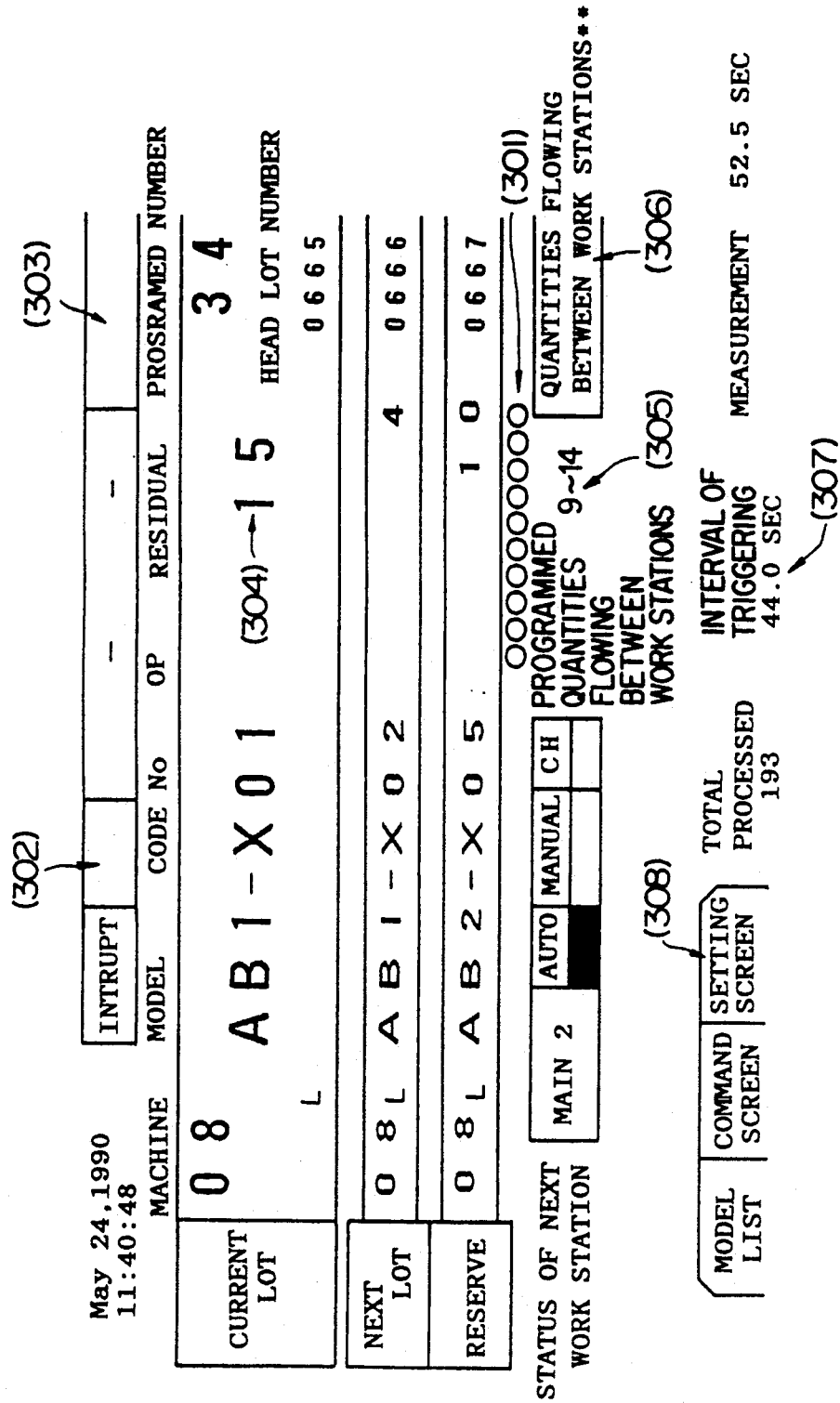
Figure 16:
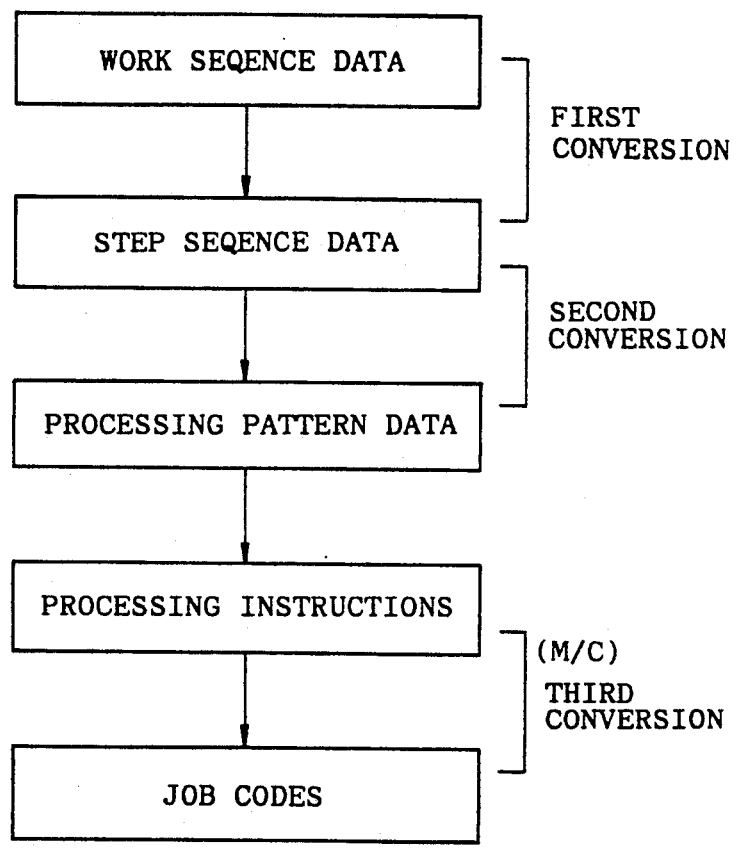
FIG. 16 is a schematic to explain the conventional production management system.

Further, with reference to FIG. 14, when settings display 308 is selected, it is possible to adjust the settings of display spaces 302 to 307.

Communication problems are displayed, for example, as in FIG. 15. Communication network functioning is checked at thirty second intervals, and when a problem is spotted, a "1" and its location number are displayed.

Furthermore, when the car body quantity is specified through the interrupt operation, as shown in the interrupt screen in FIG. 14, the corresponding model, destinations and option data are displayed automatically. Paint color grouping is not performed during processing of the current lot but is performed through the interrupt operation. Likewise, the residual quantity alteration is not performed in the current lot but is performed through the interrupt operation. When the interrupt quantity decreases to below zero, the data are cancelled automatically or by activating a cancel button.

The features of the management system described in the preferred embodiment are summarized in the following.

(1) The system is arranged so that all the processing information on car bodies 6 is centrally managed by the primary host computer 1. This organization of the computing power avoids the necessity of manual data entry by the machine operator, of such data as work sequence, analysis of processing instructions, resulting in reduced manpower effort. This organization therefore enables the attainment of the objective of increasing the efficiency of the assembly line operation thereby to derive maximum benefit of the advantages of automated production lines. Additionally, it is possible to preserve efficient operation of automated assembly line operations, even if changes are required in work sequence and correlation files. In practical terms, this means that the operator chores are lightened considerably by having the host computer 1 deal with alterations to work files and correlation files, without the necessity of manual involvement.

(2) Additionally, because the communication network 3A performs the functions of transmitting and storing work content information and files, there is a general improvement in data fidelity and reliability. The system further permits flexible changing of the work sequence data, and also permits constant updating of data, thus providing data reliability and maintainability. The number of circuits in the network 3A can be adjusted appropriately to prevent overloading its capacity.

(3) The model-group computers 2C, 2D and 2E act also a file server and provide a replacement function to host computer 1, thereby to provide data back-up service. These provisions offer additional data fidelity and reliability. By furnishing additional capacity for the continuity of data transmission to processing machines, it would be possible to guard against the possibility of file server and communication problems, thereby to increase data reliability even further.

(4) Further, the performance of the processing machines is monitored to provide highly efficient supplemental observation power to the effort of line monitoring workers to increase the efficiency of the overall line operation. Further, real time checking of the performance of the processing machines enables appropriate remedial actions to be taken quickly to prevent the production of rejects, thereby improving the efficiency of the assembly line operation, and thereby to derive maximum benefit from automated production lines.

(5) Further, in this preferred embodiment, the data concerning the quantity of processed work objects by processing machines and the cycle times for unit production are distributed through the communication network, leading to cost-effective improvement in the processing efficiency as well as to improvement in the reliability of the data because of the fidelity of the data.

(6) Because the line status can be displayed, the operative efficiency of the assembly line is increased significantly by permitting monitoring of production status in real time, leading to improved overall productivity of the automated assembly line operation. Additionally, it is possible to realize operator autonomy to provide his sense of contribution while retaining full advantages of the automated assembly line operation.

(7) Further, since work content can be altered through external intervention, and also since automatic displaying and inventorying are possible, work sequence changes can be performed efficiently. Extra operations which are not part of the regular work sequence, such as fabrication of service parts, trial fabrication and rework can be performed through the interrupt operation. Therefore, the production management system makes it possible to handle special situations with flexibility, while maintaining efficient automated production.

In the above preferred embodiment, a welding process is employed. But the present invention is not limited to a welding operation. The principle of the system is also applicable to other types of assembling operations, as are the work objects which are not restricted to car bodies.

What is claimed is:

1. A line production management system, wherein an assigned quantity of work objects flow from upstream work stations to downstream work stations according to an assigned work sequence in an automated production line, said line production management system comprising:
   a primary controller to maintain work files containing work sequence data defining the classification, work priority and quantity of the work objects to be processed, and to transmit said work files information through a communication network;
   a secondary controller to generate and maintain correlation files to correlate each work sequence data included in said work files information with codes which determine each process to be performed for each work object in each work station, and to transmit said correlation files through said communication network;
   a tertiary controller to generate step files based on said work files and correlation files received through said communication network, said step files containing processing instruction data for each work station; and
   processing means to process said work objects according to the processing instruction data received from said tertiary controller.

2. A line production management system according to claim 1, wherein said secondary controller supplements the functions provided by said primary controller and tertiary controller.

3. A line production management system according to claim 1, wherein said primary controller transmits batch processing instruction data, grouped into an assigned quantity of car bodies, to said tertiary controller and to said processing means.

4. A line production management system according to claim 1, wherein said primary controller contains information codes for the purpose of correlating and organizing information transmitted from said primary controller, wherein said information codes include at least one of model-based destination codes for each assembly line; option codes for the same; machine job pattern codes for the same; work material codes for the same; and setting of the representation numbers for the various collective codes.

5. A line production management system according to claim 1, wherein a net quantity monitoring controller is utilized to monitor dynamic quantities of production of work objects flowing between one assembly line and another assembly line to produce net quantity information which is distributed through the communication network to other controllers.

6. A line production management system according to claim 5, wherein said net quantity monitoring controller receives production status data from a plurality of processing stations, said production status data including operational mode of processing machines, such as cumulative quantities processed and machine cycle times.

7. A line production management system according to claim 5, wherein said net quantity monitoring controller computes dynamic flowing quantities of work objects between said one assembly line and neighboring assembly lines according to data obtained from said one line and from said neighboring assembly lines.

8. A line production management system according to claim 1, wherein said system is provided with:
   a net quantity monitoring controller to monitor and store data on the processing status, flow quantity and cycle times and to transmit said data to said primary controller.

9. A line production management system according to claim 1 further comprising:
   display means to display work content information on both processed and unprocessed work objects.

10. A line production management system according to claim 1, wherein said display means displays at least one group of data, transmitted through said communication network, selected from the group consisting of a summary of processing status of various lines, the status of the next processing stage, the quantities of flowing work objects, the quantities of processed work objects on processing machines and cycle times.

11. A line production management system according to claim 9, wherein said display means displays information concerning model-based processing data grouped according to destinations, and the quantities remaining in the current lot, next lot and reserved lot for each of the work objects on the line.

12. A line production management system according to claim 1 further comprising:
   external interrupt means for accepting external interrupt signals.

13. A line production management system according to claim 12, wherein said external interrupt means includes processing control signal means for controlling the operations of said processing means.

14. A line production management system according to claim 12, wherein said external interrupt means allows an operator of said processing means to select processing pattern data for processing machines, and to specify the quantity of said work objects to be processed on said processing machines.

15. A line production management system according to claim 9, wherein said display means is capable of automatically displaying identification parameters, such as models and options, to characterize said work objects.

16. A line production management system according to claim 9, wherein said display means is capable of displaying said external interrupt signal data.

17. A line production management system according to claim 1 further comprising:
monitoring means for monitoring the performance of said processing machines.

18. A line production management system according to claim 17, wherein said monitoring means is a central remote observation type monitoring means.

19. A line production management system according to claim 17, wherein said monitoring means provides at least one monitoring action through said communication network, including transmission of status data of a next processing stage and a quantity of flowing work objects or to count a quantity of work objects processed through numerically controlled processing machines or the cycle times of said processing machines.

20. A line production management system according to claim 1 further comprising:
abnormality monitoring means for monitoring the abnormality of said processing means, and
display means to display said abnormality.

21. A line production management system according to claim 20, wherein said abnormality monitoring means is a central remote observation type abnormality monitoring means.

22. A line production management system according to claim 20, wherein said abnormality monitoring means includes means for monitoring and displaying abnormalities occurring in numerical control processing means and in said communication network.

23. A line production management system according to claim 17, wherein said monitoring means is a local observation type monitoring means.

24. A line production management system according to claim 20, wherein said abnormality monitoring means is a local observation type monitoring means.

* * * * *